US007644734B2

(12) United States Patent
Palmer (10) Patent No.: US 7,644,734 B2
(45) Date of Patent: Jan. 12, 2010

(54) SAFETY CAP FOR COUPLINGS AND FITTINGS

(75) Inventor: David Palmer, San Diego, CA (US)

(73) Assignee: Safety Pumping Systems, LLC, San Diego, CA (US)

(*) Notice: Subject to any disclaimer, the term of this patent is extended or adjusted under 35 U.S.C. 154(b) by 0 days.

(21) Appl. No.: 11/848,685

(22) Filed: Aug. 31, 2007

(65) Prior Publication Data
US 2008/0223473 A1 Sep. 18, 2008

Related U.S. Application Data (60) Provisional application No. 60/895,116, filed on Mar. 15, 2007.

(51) Int. Cl.
*F16L 55/10* (2006.01)
(52) U.S. Cl. .................. 138/89; 138/90; 220/234; 220/212.5
(58) Field of Classification Search ........... 138/137, 138/140, 141, DIG. 1, 89, 96 T, 96 R; 428/36.91; 215/355, 364, 295, 296, 298, 305; D9/436, D9/443
See application file for complete search history.

(56) References Cited

U.S. PATENT DOCUMENTS

| 554,666 | A | | 2/1896 | Fellner ........................ 285/85 |
| 923,545 | A | | 6/1909 | Madison ..................... 220/300 |
| 1,200,268 | A | | 10/1916 | Strausser ..................... 285/87 |
| 1,712,232 | A | | 5/1929 | Rothfus ....................... 220/266 |
| 2,003,460 | A | * | 6/1935 | Paull ........................ 220/212.5 |
| 2,665,028 | A | | 1/1954 | Hint ............................ 220/300 |
| 3,439,942 | A | | 4/1969 | Moore et al. ................. 285/80 |
| 3,476,154 | A | | 11/1969 | Ludeman ..................... 138/89 |
| 3,672,403 | A | | 6/1972 | Wilson et al. ................ 138/89 |
| 3,722,549 | A | | 3/1973 | Wilson et al. ................ 138/89 |

(Continued)

FOREIGN PATENT DOCUMENTS

JP 2001-208277 A 8/2001

OTHER PUBLICATIONS

Quick Disconnect PP Cam and Groove Dust Cap, United States Plastics Corp. Catalog, Nov. 27, 2006, page number P-123, www.usplastic.com/catalog.

(Continued)

*Primary Examiner*—Patrick F Brinson
(74) *Attorney, Agent, or Firm*—Nydegger & Associates (57) ABSTRACT

The present invention is a male and female safety cap to protect hose and liquid transport fittings and the hand of the operator. The male safety cap has a circular disk with a diameter larger than the female fitting and a loop handle. The female safety cap has raised parallel ridges to protect the cam arm and a loop handle. A T-handle cam is provided to improve handling. In one embodiment, the safety caps are covered in a resilient material to reduce shock. In another embodiment, the safety caps are molded from an electrical dissipative material to prevent static electricity buildup and discharge when removing the safety cap. The loop handle forms a continuous arcuate structure to provide protection to the operator's hand. The safety caps can be color coded or affixed with labels to prevent product cross contamination. Safety caps can be adapted to threaded couplings and fittings.

9 Claims, 9 Drawing Sheets

U.S. PATENT DOCUMENTS

| | | | | |
|---|---|---|---|---|
| 3,828,968 A | * | 8/1974 | Kask | 220/234 |
| 3,918,582 A | * | 11/1975 | Wallace | 206/362 |
| 4,014,367 A | | 3/1977 | Milo | 138/89 |
| 4,222,593 A | | 9/1980 | Lauffenburger | 285/85 |
| 4,228,823 A | | 10/1980 | Zepeda | 138/962 |
| 4,351,446 A | | 9/1982 | Madden | 220/210 |
| 4,802,694 A | | 2/1989 | Vargo | 285/87 |
| D329,980 S | * | 10/1992 | Powell et al. | D9/443 |
| 5,184,608 A | | 2/1993 | Hale, III | 138/89 |
| 5,287,982 A | * | 2/1994 | Tsai | 220/212.5 |
| 5,358,129 A | * | 10/1994 | Watts | 215/206 |
| 5,375,730 A | | 12/1994 | Bahr et al. | 220/324 |
| D355,022 S | * | 1/1995 | Canther | D23/260 |
| 5,409,151 A | * | 4/1995 | Freimark | 224/148.6 |
| 5,454,476 A | * | 10/1995 | King et al. | 215/330 |
| 5,498,333 A | * | 3/1996 | Canther | 210/198.1 |
| 5,622,208 A | | 4/1997 | Vinson | 138/89 |
| 5,636,662 A | | 6/1997 | Olson | 138/89 |
| 5,638,976 A | * | 6/1997 | Arnold | 220/298 |
| 5,680,954 A | * | 10/1997 | Arnold et al. | 220/300 |
| 5,769,254 A | * | 6/1998 | King et al. | 215/330 |
| 5,803,126 A | | 9/1998 | Zaro | 138/89 |
| 5,927,760 A | | 7/1999 | Rocha | 285/45 |
| 6,250,337 B1 | * | 6/2001 | Bevacco | 138/89 |
| 6,412,827 B1 | | 7/2002 | Barclay et al. | 285/312 |
| 6,508,274 B2 | | 1/2003 | Street | 138/89 |
| 6,513,550 B1 | | 2/2003 | Kwilosz | 138/962 |
| 6,523,724 B2 | * | 2/2003 | Paulovich et al. | 222/189.09 |
| D479,800 S | * | 9/2003 | McRae | D9/443 |
| 6,863,086 B2 | | 3/2005 | Heiberger | 137/615 |
| 7,134,454 B2 | | 11/2006 | Montminy | 138/89 |
| D542,909 S | * | 5/2007 | Russak et al. | D23/411 |

OTHER PUBLICATIONS

Quick Disconnect PP Cam and Groove Duct Plug, United States Plastics Corp. Catalog, Nov. 27, 2006, page number P-123, www.usplastic.com/catalog.

Camlock Fittings-Part DC, Gopher Industrial Catalog, Nov. 27, 2006, www.gopherindustrial.com/camlocks/part_DC.htm.

Camlock Fittings-Part DP, Gopher Industrial Catalog, Nov. 27, 2006, www.gopherindustrial.com/camlocks/part_DP.htm.

* cited by examiner

SAFETY CAP FOR COUPLINGS AND FITTINGS

CROSS-REFERENCE TO RELATED APPLICATIONS

This application claims priority from U.S. provisional application Ser. No. 60/895,116 filed on Mar. 15, 2007, incorporated herein by reference in its entirety.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND OF THE INVENTION

1. Field of the Invention

This invention relates to protective caps for couplings, and other hose end fittings used in liquid transport and more particularly to a protective safety cap to protect couplings and hose fittings from damage, prevent electric buildup and discharge, protect from vapor discharge and protect the operator's hand.

2. Description of Related Art

Cam and groove couplings and hose fittings are used in the liquid delivery industry and in many liquid transport applications. A circumferential groove on the male fitting mates with two articulating cams inside the female fitting. The cams typically have elongated cam arms that are rotated out to release the fittings and inward against the outside of the female fitting where cam lobes engage in the groove of the male fitting.

Both the male fitting and the cam arms on the female fitting are subject to damage. Male hose end fittings are especially vulnerable to dropping, abrasion and strikes from heavy objects that will deform or break the fitting.

Damage to female fittings will deform or disable the cams or make it impossible to make a liquid tight seal between fittings. As a result, considerable time is lost trying to operate a damaged fitting. Replacing fittings can be expensive and very inconvenient to operations. Threaded fittings and victaulic fittings are also subject to damage from strikes, dropping and handling.

In addition, hose trays and tubes used to carry hoses on trucks can be damaged by the fittings when hoses are loaded and unloaded and during transport. Metal fittings are typically used for flammable liquids to avoid build up of static electricity.

Figure 1:
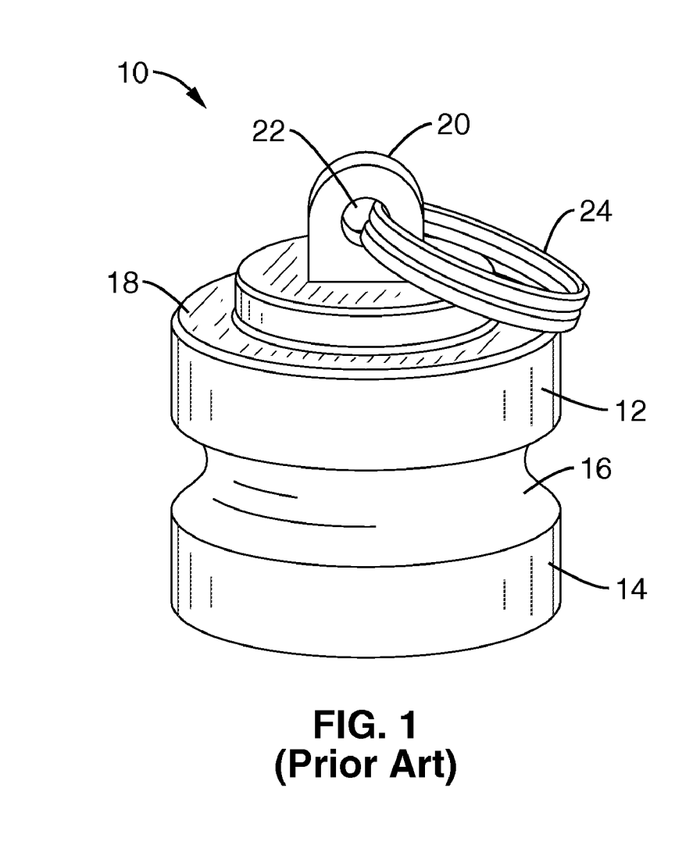
FIG. 1 depicts a cutaway perspective view of a typical prior art male safety cap.

Dust caps for male and female cam and groove fittings are known in the art. A conventional male dust cap 10 is shown in FIG. 1. The cylindrical body 12 is usually hollow and has an insertion end 14 that may have a tapered lip. A circumferential groove 16 cooperates with the cam of the female fitting. The shoulder 18 of the outside end is typically the same diameter as the inner diameter of the fitting to be protected. A tab 20 on the outside end of dust cap 10 has an aperture 20 that will accommodate a split ring 24 or keeper chain.

In use operators have to grasp the ring 24 with one finger or tab 20 with two fingers to remove the dust cap from the female fitting. This can be difficult with gloved hands and inside hose tubes. Frequent use wears out the fingers of gloves. Operators also use the ring to move the end of hoses. Movement of fluid in the hose can cause the ring to put extreme stress on the finger. If tab 20 breaks, the dust cap is useless and must be discarded. Other dust caps have a lip around the outside end of the dust cap that must be grasped by the fingers.

Because the diameter of shoulder 18 is less than the outer diameter of the fitting to be protected, it affords no protection if the fitting is struck or dropped, for example on the end of a hose.

If there is pressure built up in the capped hose, releasing the dust cap can result in vapor spray or forcible ejection of the dust cap. Some female fittings are equipped with interlocking rings on the cam arms that cooperate with a lock placed through aperture 22 or ring 24 to allow the dust cap to be locked in place to prevent unauthorized removal or vandalism.

Figure 2:
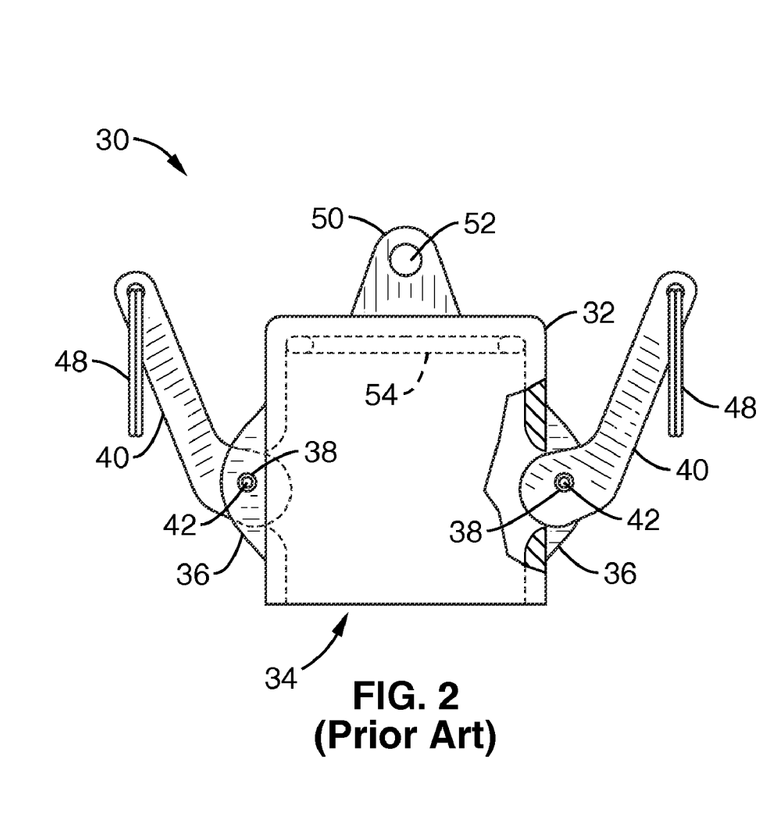
FIG. 2 depicts a cutaway perspective view of a typical prior art female safety cap.

FIG. 2 illustrates a partial cutaway view of a conventional female cap 30 for a cam and groove male fitting. Body 32 is cylindrical with opening 34 accommodating the male fitting. Note there is typically no skirt with an extended diameter at opening 34. Body 32 has a pair of cam ears 36 with apertures 38 that support rotating cam arms 40 on pins 42 in apertures 38. Rotating cam arms 40 have cam lobe 44 that extends through opening 46 in body 32 to interact with the groove in the male fitting. The ends of rotating cam arms 40 are shown with rings 48. To engage with a male fitting, a pressure of up to 35 pounds per square inch must be exerted with the palm of the hand against cam arm 40. Frequent use results in bruising of the hand.

Body 32 is closed at the top end with tab 50 having aperture 52. Rings 48 can cooperate with a lock through aperture 52 to secure cam arms 40 in the locked position. Note that cam arms 40 are exposed when in the locked position and are subject to damage if struck, dropped or dragged on pavement. The arms also cause damage to hose tubes and trays during transport. A gasket ring 54 is positioned inside body 32 to seal the end of the male fitting.

In use, the operator either has to grasp body 32, tab 50 or ring 48 with a finger to remove the cap. This can be difficult for large diameter fittings, inside hose tubes and with gloved hands. Manipulating the hose end using ring 48 can result in injuries to the finger or hand.

Dust caps for volatile or flammable service, such as in the petroleum industry are preferably made of metal such as aluminum so they dissipate any static charge that may develop during handling or connection of hoses or during pumping of fluid. The metal caps can themselves cause damage when striking other fittings, hose trays and tubes. Hard plastic dust caps are available for non-flammable liquid duty.

BRIEF SUMMARY OF THE INVENTION

The safety cap, primarily designed for the petroleum, food grade, waste, chemical, and all liquid transport transportation industry, is designed with safety, protection of equipment and protection of the environment at the forefront. Other embodiments can be used on equipment for bulk pneumatic conveying of dry products such as concrete, sand, pellets, and granulated food.

The male safety cap is constructed of a composite material having an anti static additive and consists of an insertion tube coupled to a circular disk having a circumference or skirt larger than the outer circumference of the corresponding female fitting. When mounted on a female hose fitting that is dropped, this skirt or the handle will strike the ground or surface first. The skirt also serves to protect the operator from pressurized vapor released when the cap is loosened and removed. A large loop handle that can accommodate gloved fingers is attached to the other side of the circular disk. The handle serves to absorb shock when struck or dropped. The handle is also designed to allow the operator to maneuver and twist the hose end into position.

The insertion tube, skirt, and handle are preferably molded as a single part. In another embodiment, the skirt and handle portion are coated with a heavy bonded resilient coating such as rubber to lessen shock and damage to other equipment.

The female safety cap is a cylindrical hollow body closed at one end constructed of a composite material having an anti static additive. The cap has an extended circular top or a skirt larger than the outer circumference of the corresponding male fitting. The outside of the cylinder has two pair of ridges where each ridge pair forms a slot to accommodate a cam arm. When the cam lobes are engaged in the groove of the corresponding male fitting, the arms are positioned within the ridges in the slot. In this manner they are protected from damage from dropping the female safety cap or from falling objects.

A large loop handle that can accommodate gloved fingers is attached to the closed end of the female cap and provides additional shock protection. The handle also allows the operator to maneuver and twist the attached hose end.

In another embodiment, a skirt is formed at the opening of the female cap to provide protection, and the skirt and handle are coated with a heavy bonded resilient coating such as rubber to lessen shock and damage to other equipment.

An embodiment of the invention is an apparatus for protecting a female fitting that comprises a cylindrical insertion body having distal and proximal ends, means for coupling to the female fitting positioned at the distal end, a circular disk coupled to the proximal end of the cylindrical body, where the outside diameter of the circular disk is equal to or greater than the greatest cross section dimension of the female fitting, and a loop handle coupled to the circular disk, where the long dimension of the loop handle is equal to or greater than the diameter of the insertion body.

Another aspect of the invention is a circumferential groove positioned on the outside of the cylindrical insertion body between the distal and proximal ends, where the circumferential groove is adapted to cooperate with the cams of a female cam and groove fitting.

A further aspect of the invention is where the distal end of the insertion body is adapted to mate with a female fitting selected from the group consisting of a victaulic fitting, firehose thread, acme thread, Chicago fitting, national pipe thread and propane fitting.

A still further aspect of the invention is where the long dimension of the loop handle is equal to the diameter of the circular disk, and where the outer edge of the loop handle forms a continuous arcuate structure aligned with the outside edge of the circular disk.

Another aspect of the invention is where the loop handle comprises a plurality of cutouts perpendicular to the long dimension of the loop handle.

A further aspect of the invention is where the cylindrical insertion body, the circular disk and the loop handle are molded as a single structure.

A yet further aspect of the invention is a resilient coating on the circular disk and the handle.

Another aspect of the invention is a composite material having an anti static additive.

A further aspect of the invention is where the composite material has a surface resistivity of about $10^6$ ohms per square to about $10^{12}$ ohms per square.

A still further aspect of the invention is a pressure release valve coupled to the circular disk.

Another embodiment of the invention is an apparatus for protecting a male cam and groove fitting that comprises a hollow cylindrical body having distal and proximal ends and a center axis, a planar circular top oriented perpendicular to the center axis and coupled to the proximal end of the cylindrical body, a first and second pair of ridges coupled to the outside of the cylindrical body, where the first and second pair of ridges are positioned parallel to the central axis, where each pair of ridges form a slot, a slit opening connecting the interior of the cylindrical body and the slot, a cam arm positioned in the slot, the cam arm having a cam lobe, where the cam arm is adapted to articulate in the slot, where the cam lobe adapted to engage a male cam and groove fitting through the slit opening, where the cam arm is positioned within the slot when the cam lobe is engaged with a male cam and groove fitting, and a loop handle coupled to the planar circular top.

Another aspect of the invention is a skirt coupled to the distal end of the cylindrical body, where the outside diameter of the skirt is at least equal to the greatest dimension between the first and second pair of ridges.

A further aspect of the invention is a resilient coating on the handle, the skirt, the outside of the cylindrical body and the outside of the circular top.

A still further aspect of the invention is where the outside diameter of the circular top is equal to the greatest dimension between the first and second pair of ridges, and where the long dimension of the loop handle is equal to the outside diameter of the circular top.

Another aspect of the invention is where the slot extends into the loop handle.

A further aspect of the invention is where the cylindrical body, the planar top, and the loop handle are molded as a single structure.

A still further aspect of the invention is where the cam arm comprises a T handle.

Another aspect of the invention is a pressure release valve coupled to the circular top.

A further embodiment of the invention is an apparatus for protecting a female fitting that comprises a cylindrical insertion body having distal and proximal ends, a circular disk coupled to the proximal end of the cylindrical body, where the outside diameter of the circular disk is equal to or greater than the greatest cross section dimension of the female fitting, and a loop handle coupled to the circular disk, where the long dimension of the loop handle is equal to or greater than the diameter of the insertion body.

Another aspect of the invention is where the cylindrical insertion body is adapted to mate with a female fitting selected from the group consisting of a victaulic fitting, firehose thread, acme thread, Chicago fitting, national pipe thread and propane fitting.

Another embodiment of the invention is an apparatus for protecting a male fitting that comprises a hollow cylindrical body having distal and proximal ends and a center axis, a planar circular top oriented perpendicular to the center axis and coupled to the proximal end of the cylindrical body, and a loop handle coupled to the planar circular top, where the long dimension of the loop handle is equal to the diameter of the circular top, where the interior of the hollow cylindrical body is adapted to mate with a male fitting.

Another aspect of the invention is where the hollow cylindrical body is adapted to mate with a male fitting selected from the group consisting of a victaulic fitting, firehose thread, acme thread, Chicago fitting, national pipe thread and propane fitting.

A still further embodiment of the invention is a planar circular disk, a loop handle coupled to the circular disk, means for mating to a fitting, the means for mating coupled to the circular disk, where the diameter of the circular disk is equal to or greater than the diameter of the fitting, and where the circular disk and the handle comprise a composite material with an anti static additive.

Another aspect of the invention is where the long dimension of the loop handle is equal to the diameter of the circular disk, and where the outer edge of the loop handle forms a continuous arcuate structure aligned with the outside edge of the circular disk.

A further aspect of the invention is where the means for mating comprises a cylindrical insertion body having distal and proximal ends, the proximal end coupled to the circular disk, the distal end of the insertion body adapted to mate to a female fitting.

A still further aspect of the invention is where the means for mating comprises a hollow cylindrical body having distal and proximal ends, the proximal end coupled to the circular disk, where the interior of the hollow cylindrical body is adapted to mate with a male fitting.

A further embodiment of the invention is a cam arm for use in a female cam lock cap having a cam opening that comprises an elongated body having distal and proximal ends, a T handle coupled to the distal end of the elongated body, a cam lobe coupled to the proximal end of the elongated body, an aperture positioned in the cam lobe, where the elongated body is adapted to articulate about the aperture, where the aperture is further adapted to receive a pin coupled adjacent the cam opening in a female cam lock cap, and where the cam lobe is positioned on the pin to engage the groove of a male cam and groove fitting through the cam opening in the female cam lock cap.

Another aspect of the invention is the female cam lock cap further comprising a loop handle, where the long dimension of the loop handle is equal to the largest diameter of the female cam lock cap, where the outer edge of the loop handle forms a continuous arcuate structure, where the elongated body is curved to conform to the arcuate outer edge of the loop handle, and where the T handle is curved to conform to the circumference of the female cam lock cap.

A still further aspect of the invention is a first and second pair of ridges in the female cam lock cap extending into the loop handle, where the first and second pair of ridges each form a slot that is connected to the cam opening, a notch in the loop handle adapted to receive the T handle of the cam arm, where the elongated body of the cam arm is positioned within the slot and the T handle is positioned in the notch when the cam lobe engages the groove in the male cam and groove fitting.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The accompanying drawings, which are incorporated in and form a part of this specification, illustrate embodiments of the invention and together with the detailed description, serve to explain the principles of this invention.

DETAILED DESCRIPTION OF THE INVENTION

Referring more specifically to the drawings, for illustrative purposes the present invention is embodied in the apparatus generally shown in FIG. 3 through FIG. 16. It will be appreciated that the apparatus may vary as to configuration and as to details of the parts, and that the method may vary as to the specific steps and sequence, without departing from the basic concepts as disclosed herein.

Figure 3:
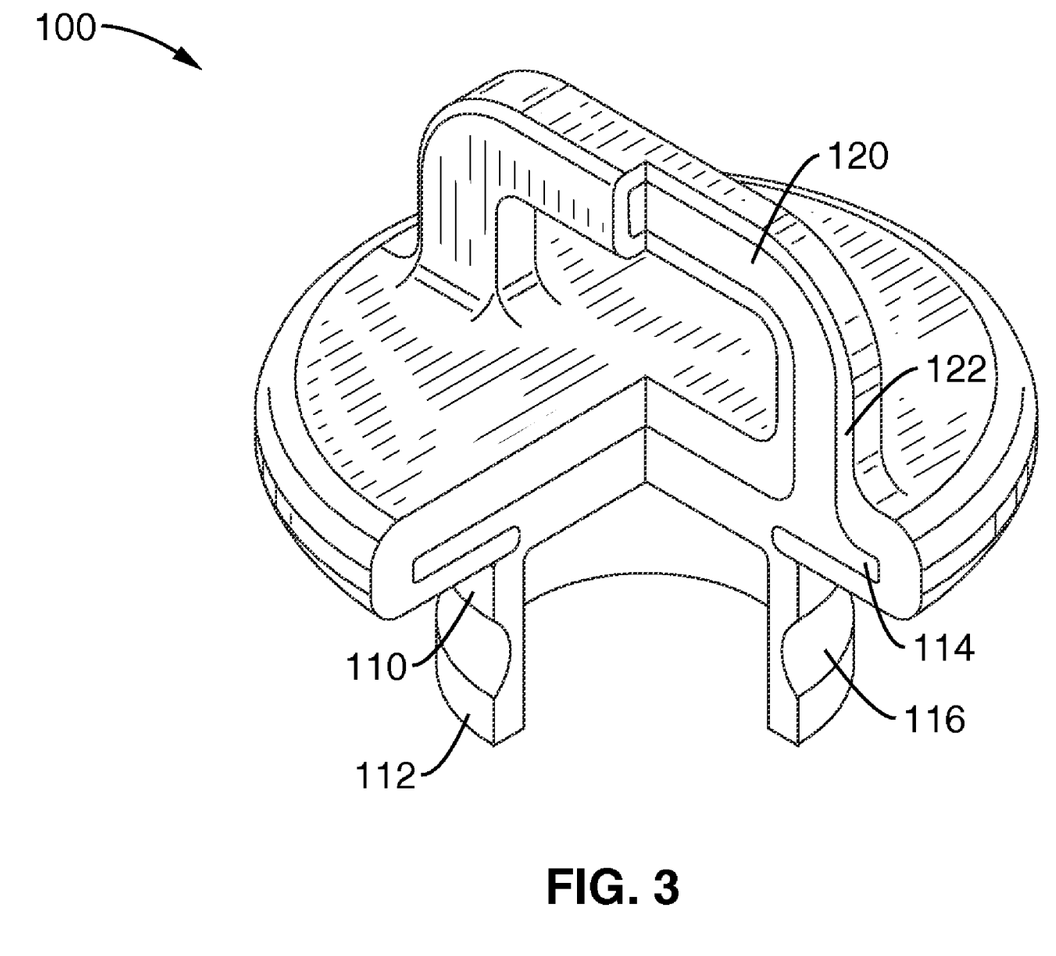
FIG. 3 depicts a cut away view of an embodiment of a male safety cap according to the invention.

FIG. 3 is a partial cutaway view of a male safety cap 100 according to an embodiment of the present invention. Body 110 has cylindrical insertion end 112 and planar circular disk 114. Insertion end 112 has a circumferential groove 116 with a cross section adapted to receive cam lobes of female fittings.

Planar circular disk 114 has a loop handle 120 that has a length at least the diameter of insertion end 112. In a preferred embodiment, loop handle 120 can accommodate four fingers of a gloved hand and can be used to position a hose attached to male safety cap 100.

The diameter of planar portion 114 is equal to or greater than the outside diameter or largest cross section dimension of the corresponding female fitting. In one variation, the diameter of planar portion 114 is greater than the outside distance between the opposing cam ears and the cam arms to be protected. A resilient coating 122, such as rubber, is placed on the outside of planar portion 114 and loop handle 120. This coating also serves to provide additional shock protection. The greater diameter of planar portion 114 will also deflect vapor or liquid spray if male safety cap 100 is removed from a fitting under pressure.

Body 110 is preferably molded as a single structure. In another variation of the invention, insertion end 112 is closed, filled or molded as a solid cylinder instead of hollow.

Figure 4:
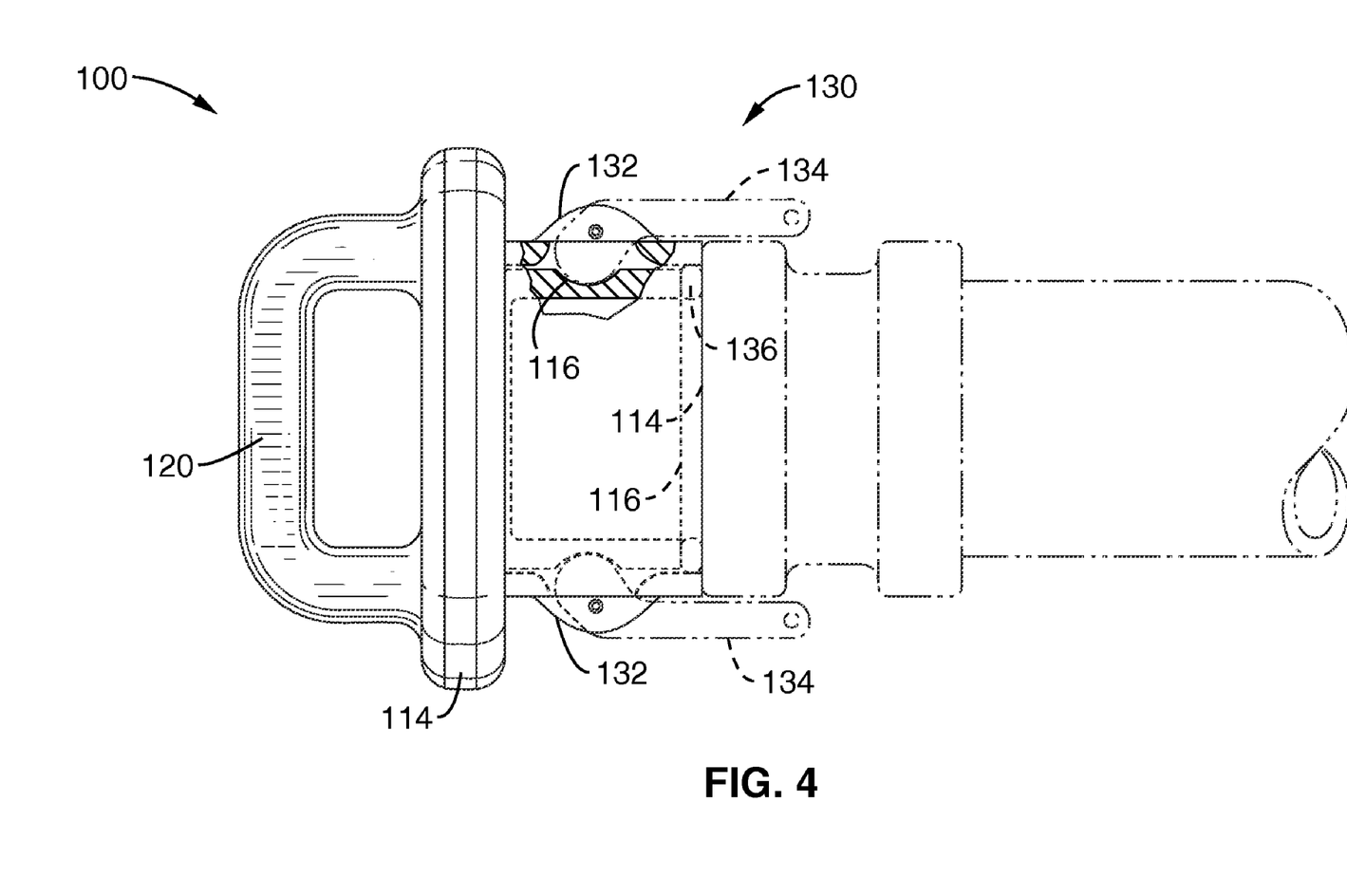
FIG. 4 is a perspective view of a male safety cap as shown in FIG. 3 coupled to a female cam and groove hose fitting.

FIG. 4 is a partial cutaway view showing male safety cap 100 attached to a female cam and groove fitting 130. Female fitting 130 has opposing cam ears 132 supporting cam arms 134 and internal gasket 136. When mated, insertion end 114 contacts gasket 136. Cam arm 134 cooperates with groove 116 on insertion end 114 of male safety cap 100. Note that the outside diameter of planar disk 114 extends past cam ears 132 and cam arm 134 effectively preventing them from touching the ground if the fitting is dropped.

Figure 5:
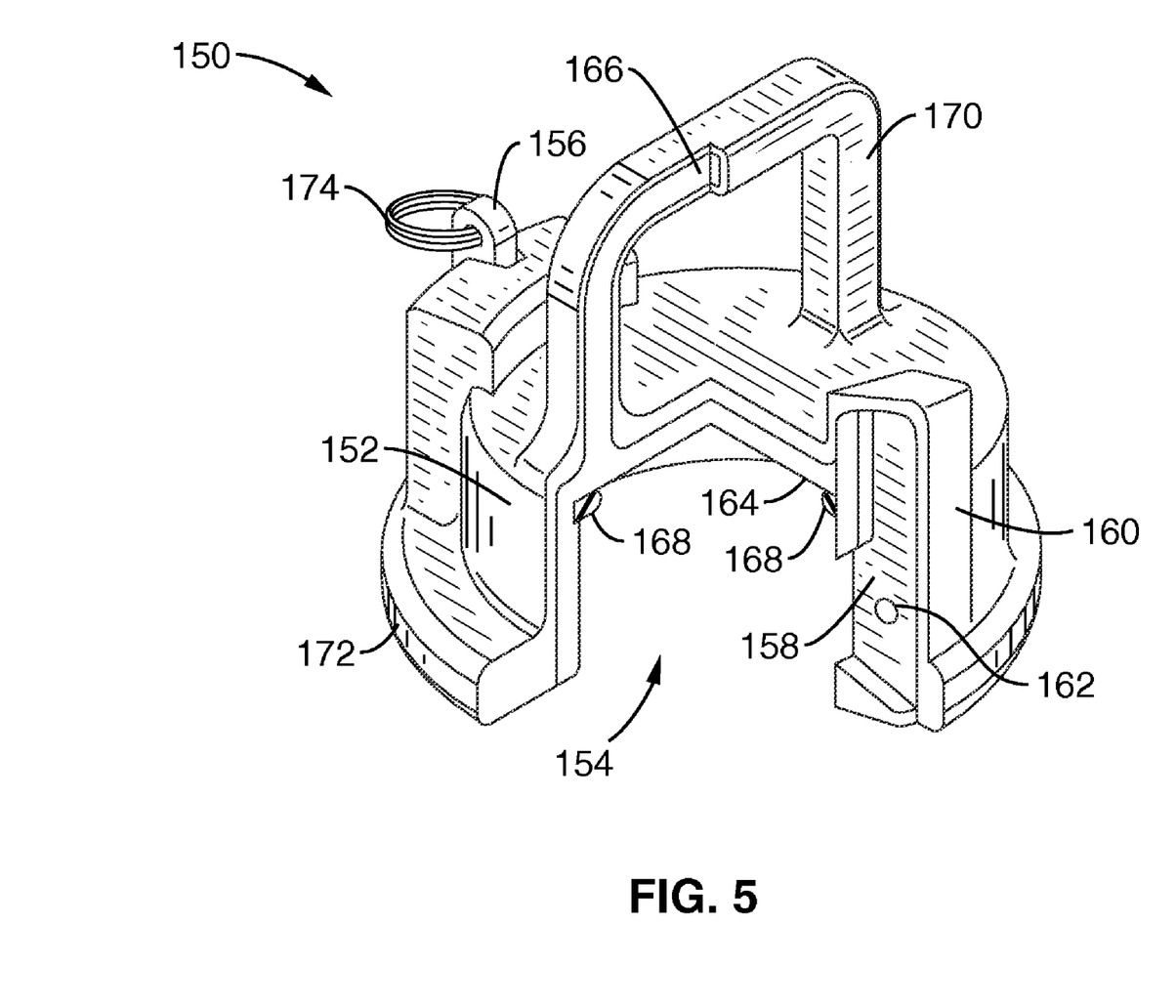
FIG. 5 is a cutaway view of a female safety cap according to an embodiment of the invention.

FIG. 5 is a partial cutaway view of a female safety cap 150 according to an embodiment of the invention. Cap 150 has cylindrical body 152 with opening 154 at the insertion end. To accommodate cam arms 156, body 152 has slit opening 158 that accommodates a cam lobe. Parallel ridges 160 run along the length of cylindrical body 152 and extend outward from body 152 to protect cam arms 156 when they are in the locked position. Apertures 164 are positioned through ridges 160 to receive a pin to pivot the cam arm 156.

Body 152 has a circular planar disk top 164 that has a loop handle 166 extending upward. A circular gasket 168 is seated beneath circular planar top 164. A resilient coating 170, such as rubber, coats the outside of body 152 and handle 166. A skirt 172 is formed of resilient coating 170 at opening 154 with a diameter greater than the largest cross section dimension of ridges 160. Rings 174 may be placed on the ends of cam arms 156 to facilitate locking and unlocking female safety cap 150.

Body 152 is made from a durable material and is preferably molded as a single structure.

Figure 6:
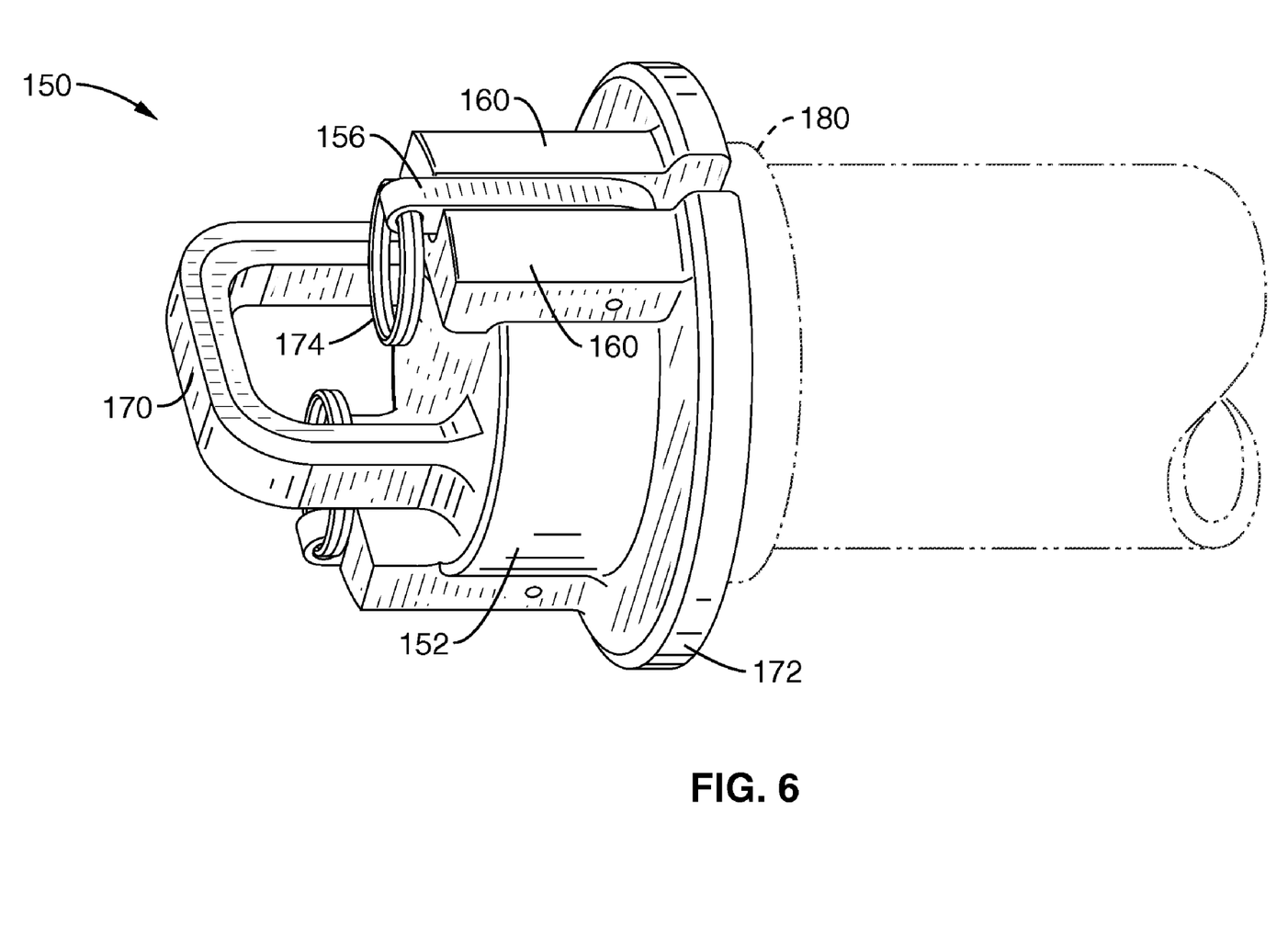
FIG. 6 is a perspective view of a female safety cap as shown in FIG. 5 coupled to a male cam and groove hose fitting.

FIG. 6 illustrates the female safety cap 150 shown in FIG. 5 coupled to a male fitting 180 at the end of a hose. Skirt 172 prevents the attached male fitting 180 from striking the ground. Ridges 160 protect closed cam arms 156.

Figure 7:
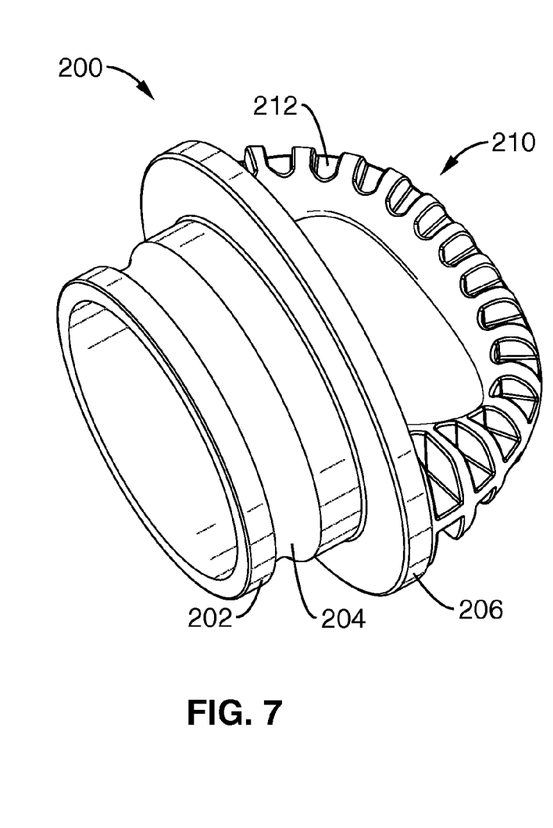
FIG. 7 is a perspective view of another embodiment of a male safety cap according to the invention.

FIG. 7 illustrates another embodiment of a male safety cap 200 adapted to couple to a female cam and groove fitting. Male safety cap 200 has a cylindrical insertion body 202 with a circumferential groove 204 that is adapted to cooperate with the cam lobes of a female cam and groove fitting. A circular disk 206 is attached to cylindrical body 202 and has a diameter that is equal to or greater than the outside diameter of the associated female fitting or its greatest cross section dimension. Circular disk 206 will also deflect vapor or liquid spray if safety cap 200 is removed from a fitting under pressure. In one embodiment, the diameter of the circular disk is one inch greater than the greatest cross section of the associated 3-4 inch nominal female fitting. A loop handle 210 is attached to circular disk 206 and has perpendicular cutouts 212 to facilitate molding and provide a textured gripping surface.

In another embodiment, the long dimension of loop handle 210 is about the diameter of circular disk 206 and the outer edge of handle 210 forms a continuous arcuate structure from edge to edge of circular disk 206 to protect the top of male safety cap 200. This ergonomic handle is designed to accommodate four fingers of a gloved hand and provides the operator a convenient method for handling the fitting end of hoses typically used in petroleum delivery and transport. The long dimension of the handle also protects an operator's hand while handling the hose end.

In one embodiment, male safety cap 200 is molded as a single structure. Preferably, male safety cap 200 is manufactured to cooperate with nominal 3 inch and 4 inch fittings. The molded material can also be color coded to designate product and eliminate cross contamination.

In another embodiment, male safety cap 200 is made from polypropylene. In a further embodiment, male safety cap 200 is a composite made from polypropylene, fiber glass and an antistatic additive, having surface resistivity from about $10^6$ to about $10^{12}$ $\Omega$/sq (ohms per square) where square is a dimensionless value. A preferred composite is rated at about $10^9$ $\Omega$/sq for surface resistivity and $40^7$ $\Omega$/sq for volume resistivity. For comparison, electrostatic shielding composites range from 10 to $10^2$ $\Omega$/sq, conductive composites range from $10^2$ to $10^5$ $\Omega$/sq, dissipative composites range from $10^6$ to $10^9$ $\Omega$/sq and antistatic composites range from $10^9$ to $10^{12}$ $\Omega$/sq. The dissipative and anti static properties of the safety cap are important to prevent static buildup and/or electrical discharge when the safety cap is handled or is removed from the fitting.

In a preferred embodiment, the composite material is a combination of polypropylene, less than 10% of short fiber (3 mm) glass, and an anti-static polymeric additive. An example of an anti-static additive is Ciba Irgastat P18®. In an embodiment for food grade use, the composite material is FDA certified polypropylene and an anti static additive such as CIBA Irgastat P16®.

In a further embodiment, a manually activated, pressure release valve is placed in circular disk 206 and in fluid connection with the interior of cylindrical insertion body 202. This pressure release valve is further described in FIG. 8.

Figure 8:
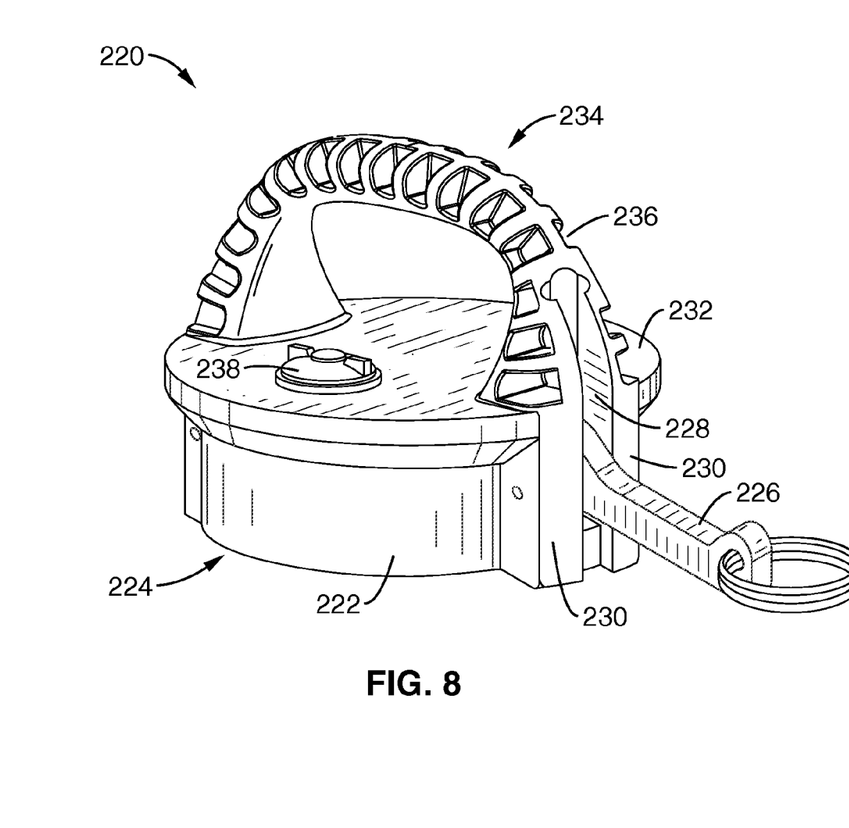
FIG. 8 is a perspective view of another embodiment of a female safety cap according to the invention.

FIG. 8 illustrates another embodiment of a female safety cap 220 according to the invention. Cap 220 has cylindrical body 222 with opening 224 at the insertion end. To accommodate opposing cam arms 226, body 222 has slot 228 that supports cam arm 226. Slot 228 is formed by parallel ridges 230 that run along the length of cylindrical body 222 and project outward from body 222 to protect cam arms 226 when they are in the locked position. A slit opening in slot 228 to accommodate the cam lobes is present but not shown.

Cylindrical body 222 has a circular disk top 232 with a diameter at least equal to the greatest dimension between opposing ridges 230. In one embodiment, the diameter of circular disk top 232 is one inch greater than the associated male fitting. A gasket (not shown) is positioned inside cylindrical body 222 and against the inside of circular disk top 232.

A loop handle 234 is attached to circular disk 232 with the long dimension of handle 234 about equal to the diameter of circular disk 232. Note that slot 228 extends into handle 234 to protect the end of cam arm 226. Loop handle 234 has a series of cutouts 236 to facilitate molding and provide a gripping region for handle 234. The outer edge of handle 234 forms a continuous arcuate structure to the outside edges of ridges 230 to protect the top of safety cap 220. This ergonomic handle is designed to accommodate four fingers of a gloved hand and provides the operator a convenient method for handling the fitting end of a hose typically used in petroleum transport and delivery. The handle also protects the hand during manipulation of the hose end.

In one embodiment, female safety cap 220 is molded as a single structure. Preferably, female safety cap 220 is manufactured to cooperate with nominal 3 inch and 4 inch camlock fittings. The molded material can also be color coded to designate product and eliminate cross contamination.

In another embodiment, female safety cap 220 is made from a polypropylene composite with surface resistivity from about $10^6$ to about $10^9$ Ω/sq. The preferred material has a dissipative composite rated at about $10^9$ Ω/sq for surface resistivity and about $40^7$ Ω/sq for volume resistivity. In a further embodiment, the composite material is a combination of polypropylene, short fiber glass and an anti-static additive. For food grade use, the preferred composition is FDA certified polypropylene, and an anti static additive.

In a further embodiment, a manually activated, pressure release valve 238 is placed in circular disk 232 and in fluid connection with the opening 224 of cylindrical body 222. Pressure release valve 238 can be activated before removing the safety cap where high vapor pressure products such as gasoline, alcohols and solvents are used. This pressure release valve can also be used to relieve pressure on hoses and tanks due to change in altitude on transport vehicles. One type of pressure release valve is spring loaded and releases pressure when pressed by the hand or finger. Another type uses a twisting action to lock the valve open or closed. Pressure release valves can also be integrated with the embodiments of male safety caps.

Figure 9:
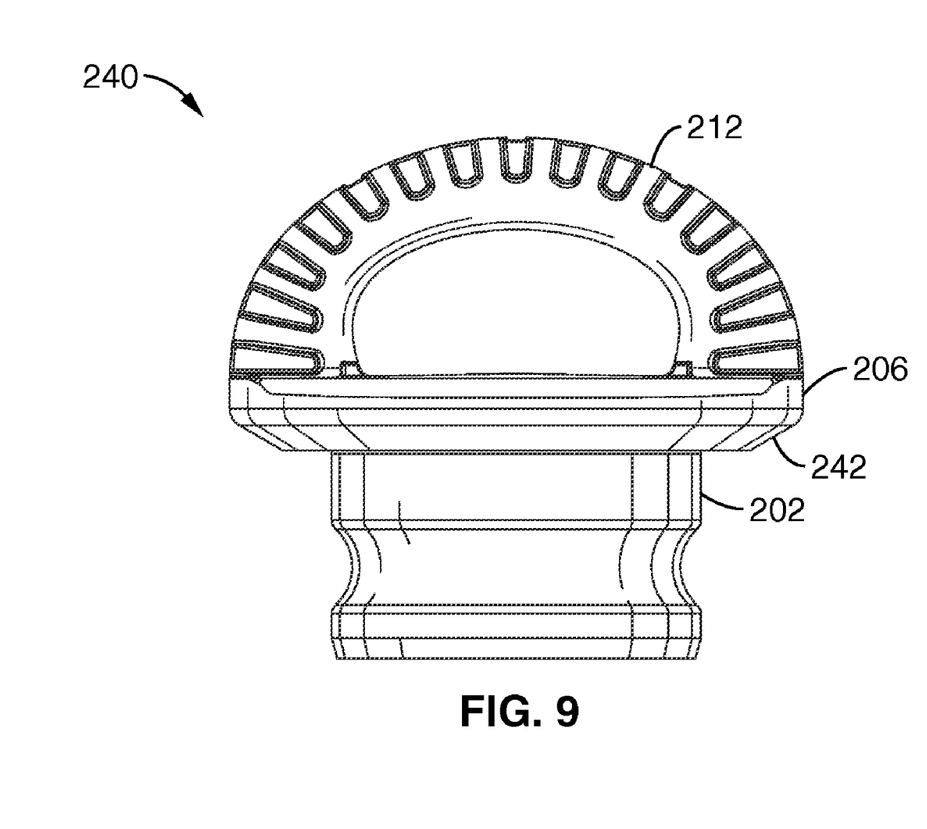
FIG. 9 is a perspective view of a male safety cap showing a tapered edge.

FIG. 9 illustrates another embodiment of a male safety cap 240 where the transition 242 from the insertion tube 202 to the circular disk 206 is tapered or beveled to prevent catching on projections when the hose end with the safety cap attached is dragged.

Figure 10:
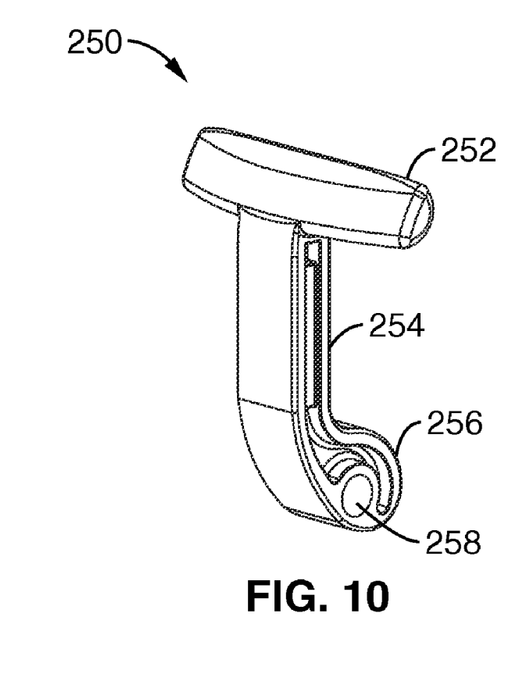
FIG. 10 a perspective view of a T handle cam arm for a female safety cap.
Figure 11:
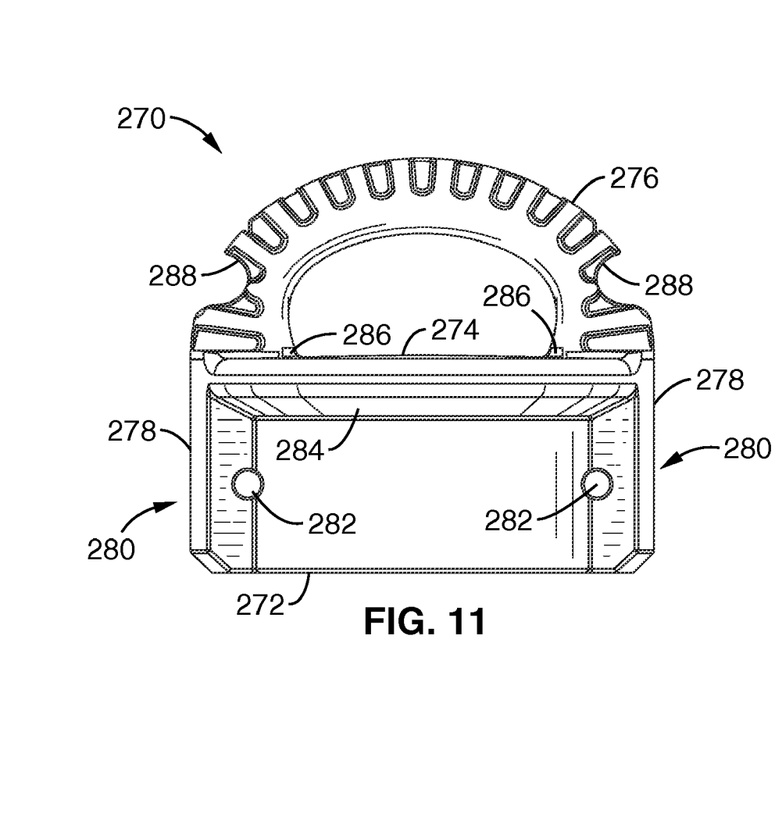
FIG. 11 is a perspective view of a female safety cap showing a taper edge and cut outs for a label.
Figure 12:
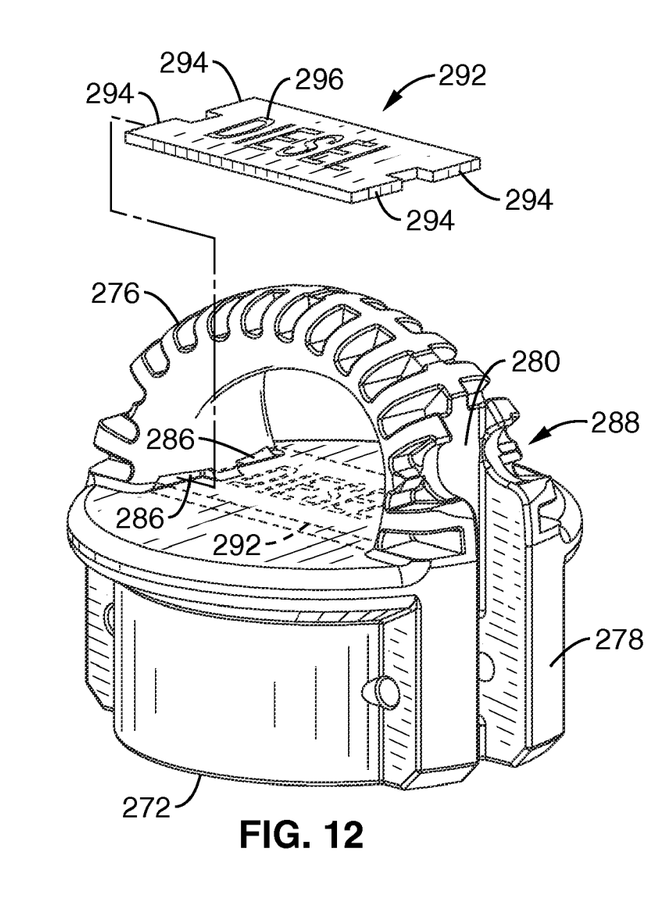
FIG. 12 is a perspective view of the female safety cap shown in FIG. 11 adapted to use a T-handle and receive a label.

FIG. 10 illustrates a T-shaped cam arm 250 for use with a further embodiment of the female safety cap shown in FIG. 11 and FIG. 12. T-handle cam arm 250 consists of a handle section 252, elongated body 254, cam 256 and aperture 258. The handle section 252 is perpendicular to elongated body 254 and has a curved outer surface that conforms to the circumference of the circular disk on the female safety cap. When closing a cam on a female cam and groove fitting, as much as 35 pounds of pressure must be exerted against the cam arm, typically with the palm of the hand. A typical cam arm with sharp edges (see FIG. 2) will cause bruising or damage to operators hand with frequent use. The handle section 252 of cam arm 250 provides additional surface area to apply this pressure mitigating damage to the operator's hand. In one embodiment, handle section 252 is about 2.5 inches long and elongated body 254 is about 2.5 inches long for a T handle on a nominal 3-4 inch safety cap.

The handle section 252 can be grasped and opened with multiple fingers of a gloved hand compared to pulling a ring with one finger. The handle section 252 can also be used to secure the cap to a fitting by using split rings or zip ties through one ear of the handle or around the body of the T shaped cam arm.

In one embodiment, the radius of cam 256 is less than a conventional cam to lower the pressure required against the handle section to close the cam. In a preferred mode, the radius of the cam 256 for nominal 3 inch and 4 inch safety cap handles is about 0.49 inches to about 0.62 inches.

In one embodiment, the T-handle is made of a durable material such as nylon. One example is nylon 66 (DuPont Zytel). In another embodiment, the T-handle is made from a polypropylene composite with an anti static additive. Although T-handle cam arm 250 is preferred for use with the female safety cap shown in FIG. 11 and FIG. 12, it can also be adapted for use with prior art dust caps as shown in FIG. 2.

FIG. 11 illustrates a further embodiment of a female safety cap 270 according to the invention. Cap 270 has a cylindrical body 272, circular top 274 and arcuate handle 276. Parallel ridges 278 run along the length of cylindrical body 264 and extend out to form slots 280. An aperture 282 through ridges 278 aligns with aperture 258 of the T handle cam arm 260 shown in FIG. 10 and receives a pivot pin (not shown).

The transition 284 between body 272 and circular top 274 is beveled. This helps mitigate catching edges and protrusions when a hose end is dragged with the safety cap attached.

Small grooves 286 at the base of arcuate handle 276 are positioned to secure product labels as will be shown in FIG. 12. Notches 288 are positioned in arcuate handle 276 perpendicular to slot 280 to receive handle 252 of cam arm 250 shown in FIG. 10. When closed, the outer curved surface of elongated body 254 and handle 252 of cam arm 250 is flush with the outer surface of parallel ridges 278 and arcuate handle 276. This feature is important to prevent unintended opening or damage to cam arm 150 when safety cap 270 is dragged.

FIG. 12 is a perspective view of the female safety cap 270 shown in FIG. 11. Product label 292 has tabs 294 that fit in the small grooves 286 at the base of arcuate handle 276. Product label 292 has indicia 296 corresponding to a specific product. Indicia 296 can be raised, engraved or embossed lettering. Product label 292 can also be color coded. Product labels can be attached to both male and female safety caps.

FIG. 12 also illustrates that slot 280 extends into arcuate handle 276 so that the outer surface of cam arm 250 is flush with the outer surface of arcuate handle 276 when in the closed position. This slot can also receive a pry tool such as a screwdriver to urge the cam arm open.

Figure 13:
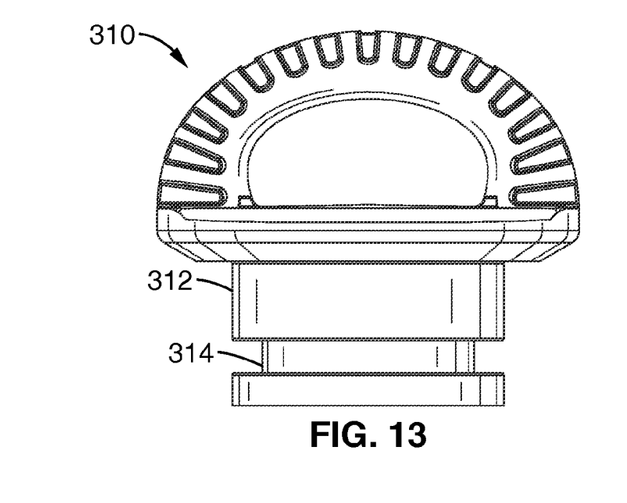
FIG. 13 illustrates an embodiment of a male safety cap to protect a hose fitting with vitaulic coupling.

FIG. 13 illustrates an embodiment of a male safety cap 310 with a cylindrical insertion end 312 having a circumferential groove 314 with a cross section adapted to receive a victaulic coupling.

Figure 14:
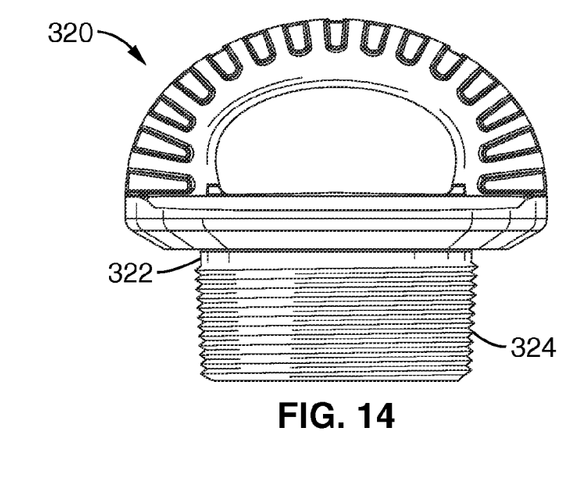
FIG. 14 illustrates an embodiment of a male safety cap to protect a female threaded fitting.

FIG. 14 illustrates an embodiment of a male safety cap 320 with a cylindrical insertion end 322 having threads 324 adapted to mate with a female hose coupling. The thread can be tapered or non tapered, firehose thread or National Pipe Thread (NPT), right or left-handed. A corresponding female safety cap embodiment with the circular top to protect the associated male fitting and ergonomic loop handle to maneuver a hose end where the interior of the cylindrical body is adapted to couple to the male fitting and thread pattern is not shown. These safety caps can be adapted to the nominal sizes of fittings used in the various industries.

Figure 15:
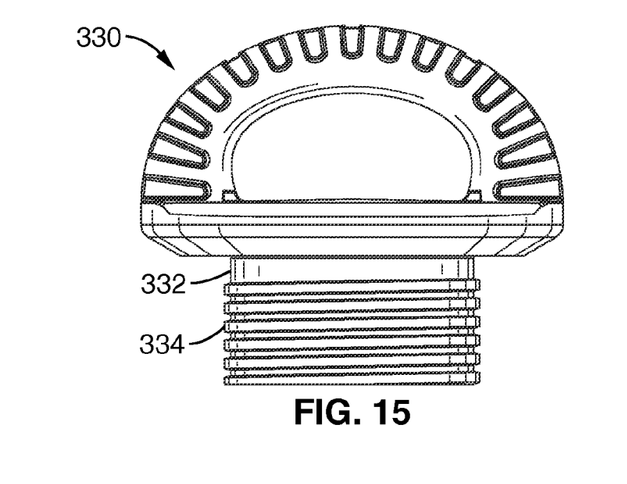
FIG. 15 illustrates an embodiment of a male safety cap to protect a female fitting with acme threads.

FIG. 15 illustrates an embodiment of a male safety cap 330 with a cylindrical insertion end 332 having acme threads 334 adapted to mate with a female acme threaded coupling. The acme thread can be food grade, single lead, general, right or left handed. A propane fitting is an example of an acme thread fitting. A corresponding female safety cap embodiment with the circular top to protect the associated male fitting and ergonomic loop handle to maneuver a hose end where the interior of the cylindrical body is adapted to couple to the male fitting and thread pattern is not shown. These safety caps can be adapted to the nominal sizes of fittings used in the various industries.

Figure 16:
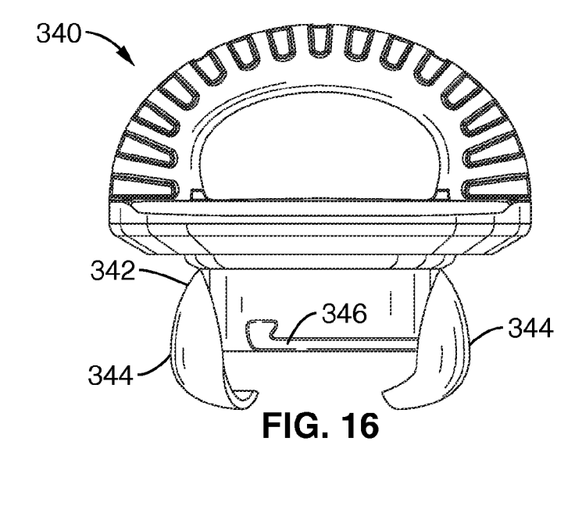
FIG. 16 illustrates an embodiment of a male safety cap to protect a Chicago fitting.

FIG. 16 illustrates a male safety cap 340 adapted to couple to a Chicago fitting, also known as a crow's foot fitting or twist lock fitting. Insertion tube 342 has a pair of claws 344 and a pair of locking flanges 346 that mate to a corresponding fitting. In another embodiment, there are four claws and four locking flanges on the Chicago safety cap.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. An apparatus for protecting a female fitting comprising:
    a cylindrical insertion body having distal and proximal ends;
    a circular disk coupled to said proximal end of said cylindrical body;
    wherein the outside diameter of said circular disk is equal to or greater than the greatest cross section dimension of the female fitting;
    a loop handle coupled to said circular disk;
    wherein the long dimension of said loop handle is equal to or greater than the diameter of said insertion body; and
    wherein said distal end of said cylindrical insertion body is adapted to mate with a female fitting.

2. An apparatus as recited in claim 1, wherein said cylindrical insertion body is adapted to mate with a female fitting selected from the group consisting of a cam and groove fitting, victaulic fitting, firehose thread, acme thread, Chicago fitting, and national pipe thread.

3. An apparatus for protecting a male fitting having a cylindrical insertion body with a circumferential groove comprising:
    a hollow cylindrical body having distal and proximal ends and a center axis;
    a planar circular top oriented perpendicular to the center axis and coupled to the proximal end of said cylindrical body;
    a loop handle coupled to said planar circular top;
    wherein the long dimension of said loop handle is equal to the diameter of said circular top; and
    rotating cam ears coupled to said hollow cylindrical body;
    wherein said rotating cam ears are configured to mate with the circumferential groove of the male fitting.

4. An apparatus as recited in claim 3, further comprising a pressure relief valve mounted on said circular top and fluidly connected to said hollow cylindrical body.

5. An apparatus for protecting a female fitting having rotating cam arms comprising:
    a planar circular disk;
    a loop handle coupled to said circular disk;
    means for mating to rotating cam arms, said means for mating coupled to said circular disk;
    wherein said rotating cam arms have an open position and a locked position; and
    wherein the diameter of said circular disk is equal to or greater than the diameter of said female fitting with said cam arms in the locked position.

6. An apparatus as recited in claim 5:
    wherein the long dimension of said loop handle is equal to the diameter of said circular disk; and
    wherein the outer edge of said loop handle forms a continuous arcuate structure aligned with the outside edge of said circular disk.

7. An apparatus as recited in claim 5, said means for mating comprising:
    a cylindrical insertion body having distal and proximal ends, said proximal end coupled to said circular disk;
    said distal end of said insertion body adapted to mate to a female fitting.

8. An apparatus as recited in claim 5, further comprising a pressure relief valve coupled to said circular disk.

9. An apparatus as recited in claim 5, wherein said circular disk and said handle comprise a composite material with an anti static additive and wherein said composite material has a surface resistivity of about $10^6$ ohms per square to about $10^{12}$ ohms per square.

* * * * *